(12) United States Patent
Guo et al.

(10) Patent No.: US 9,635,018 B2
(45) Date of Patent: Apr. 25, 2017

(54) USER IDENTITY VERIFICATION METHOD AND SYSTEM, PASSWORD PROTECTION APPARATUS AND STORAGE MEDIUM

(71) Applicant: Tencent Technology (Shenzhen) Company Limited, Shenzhen (CN)

(72) Inventors: Jiwei Guo, Shenzhen (CN); Xin Yu, Shenzhen (CN); Luyi Lin, Shenzhen (CN); Shan Lu, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 0 days.

(21) Appl. No.: 15/140,111

(22) Filed: Apr. 27, 2016

(65) Prior Publication Data

US 2016/0241544 A1 Aug. 18, 2016

Related U.S. Application Data

(63) Continuation of application No. PCT/CN2014/089047, filed on Oct. 21, 2014.

(30) Foreign Application Priority Data

Oct. 28, 2013 (CN) .......................... 2013 1 0516393

(51) Int. Cl.
*H04L 29/06* (2006.01)
*H04W 12/06* (2009.01)
(Continued)

(52) U.S. Cl.
CPC ............ *H04L 63/083* (2013.01); *G06F 21/31* (2013.01); *G06F 21/85* (2013.01); *H04L 9/3215* (2013.01);
(Continued)

(58) Field of Classification Search
CPC ... H04L 63/083; H04L 9/3215; H04L 9/3226; G06F 21/31; G06F 21/85; G06F 2221/2115; H04W 12/06
See application file for complete search history.

(56) References Cited

U.S. PATENT DOCUMENTS 6,918,044 B1 * 7/2005 Robins .................. H04L 63/083
709/208
7,809,651 B2 * 10/2010 Weiss ...................... G06F 21/32
705/51
(Continued)

FOREIGN PATENT DOCUMENTS

CN 101707772 A 5/2010
CN 102184498 A 9/2011
(Continued)

OTHER PUBLICATIONS

Tencent Technology, ISRWO, PCT/CN2014/089047, Jan. 28, 2015, 6 pgs.
Tencent Technology, IPRP, PCT/CN2014/089047, May 3, 2016, 4 pgs.

*Primary Examiner* — Jung Kim
*Assistant Examiner* — James J Wilcox
(74) *Attorney, Agent, or Firm* — Morgan, Lewis & Bockius LLP (57) ABSTRACT

A user verification method and system, a password protection apparatus and a storage medium are disclosed, and the method includes: receiving an operation request containing a user identity of a user sent by the user via a user terminal; generating identity verification information according to the user identity; sending the identity verification information to an NFC terminal through near field communication with the NFC terminal, so that the NFC terminal prompts the user to provide identity acknowledgement; receiving identity acknowledgement information from the NFC terminal, if the (Continued)

identity acknowledgement is provided by the user, where the identity acknowledgement information contains an identifier of the NFC terminal; determining whether the user identity matches the identifier of the NFC terminal according to the identity acknowledgement information; and sending operation response information to the user terminal of the user if the user identity matches the identifier of the NFC terminal.

9 Claims, 4 Drawing Sheets (51) Int. Cl.
    *G06F 21/35*     (2013.01)
    *G06F 21/85*     (2013.01)
    *H04L 9/32*     (2006.01)
    *G06F 21/31*     (2013.01)

(52) U.S. Cl.
    CPC ........... *H04L 9/3226* (2013.01); *H04W 12/06* (2013.01); *G06F 2221/2115* (2013.01)

(56) References Cited

U.S. PATENT DOCUMENTS

| | | | | |
|---|---|---|---|---|
| 8,478,196 B1* | 7/2013 | Hewinson | ............ | H04B 5/0031 235/379 |
| 8,644,760 B2* | 2/2014 | Tuikka | ............ | H04W 8/24 340/5.61 |
| 8,843,065 B2* | 9/2014 | Degauque | ............ | G06K 7/10247 235/492 |
| 9,264,104 B2* | 2/2016 | Park | ............ | G06Q 50/01 |
| 9,438,597 B1* | 9/2016 | Taylor | ............ | H04L 63/10 |
| 2006/0104441 A1* | 5/2006 | Johansson | ............ | G06F 21/31 380/44 |
| 2008/0289030 A1* | 11/2008 | Poplett | ............ | G06F 21/31 726/15 |
| 2011/0029777 A1* | 2/2011 | Murakami | ............ | G06F 9/4401 713/171 |
| 2012/0028578 A1* | 2/2012 | Tuikka | ............ | H04W 8/24 455/41.1 |
| 2012/0310839 A1* | 12/2012 | Chen | ............ | H04W 12/02 705/67 |
| 2013/0298037 A1* | 11/2013 | Matthews, III | ......... | H04L 63/08 715/753 |
| 2013/0305354 A1* | 11/2013 | King | ............ | G06F 21/31 726/19 |
| 2013/0318591 A1* | 11/2013 | Zhu | ............ | H04L 9/321 726/8 |
| 2014/0215585 A1* | 7/2014 | Sanaullah | ............ | H04L 63/0281 726/6 |
| 2015/0264574 A1* | 9/2015 | Dong | ............ | G10L 17/00 455/411 |
| 2015/0371227 A1* | 12/2015 | Foulds | ............ | H04W 12/06 705/44 |
| 2016/0050203 A1* | 2/2016 | Hefetz | ............ | H04L 63/18 726/7 |
| 2016/0277380 A1* | 9/2016 | Wagner | ............ | H04L 63/0861 |

FOREIGN PATENT DOCUMENTS

| | | |
|---|---|---|
| CN | 103138935 A | 6/2013 |
| CN | 103259667 A | 8/2013 |

* cited by examiner

USER IDENTITY VERIFICATION METHOD AND SYSTEM, PASSWORD PROTECTION APPARATUS AND STORAGE MEDIUM

CROSS-REFERENCE TO RELATED APPLICATIONS

This application is a continuation application of PCT Patent Application Ser. No. PCT/CN2014/089047, entitled "USER IDENTITY VERIFICATION METHOD AND SYSTEM, PASSWORD PROTECTION APPARATUS AND STORAGE MEDIUM" filed on Oct. 21, 2014, which claims priority to a Chinese patent application No. 201310516393.7, entitled "USER IDENTITY VERIFICATION METHOD AND SYSTEM, AND PASSWORD PROTECTION APPARATUS" filed on Oct. 28, 2013, the content of which are incorporated herein by reference in their entirety.

TECHNICAL FIELD

The present disclosure relates to the field of communication technologies, and particularly to a user identity verification method and system, a password protection apparatus, and a storage medium.

BACKGROUND

With the rapid development of a variety of online applications, theft of network property such as a user account happens increasingly, thus a variety of network property of the user encounter more and more threats. The traditional way of a login password set by the user may be cracked by brute-force attacks, keyboard input interception, screen shots, etc., thus it is insufficient to prove the legitimacy of the user identity through an identity verification method based on merely password verification. In view of this, a way of verifying an identity credential pertaining to the user only is employed additional to prove the legitimacy of the user identity in online applications.

The current identity verification method consists of identity registration and identity authentication. The identity registration refers to negotiation with an authentication system over an identity credential pertaining to the user, and the identity authentication refers to determining the legitimacy of the user identity by the authentication system through verifying an identity credential pertaining to the user that is submitted by the user.

The current identity verification method is mostly based on verification of passwords, including static passwords and dynamic passwords. The static password is poor in security for being easy to be intercepted by keyboard Trojan horses and to be cracked by brute-force attacks. The dynamic password is randomly generated in use, is valid within a specified time period and may be validated only once, thus avoids the risk of being intercepted by Trojan horses, but still suffers from the possibility of phishing within a short time. Also, the user is required to enter user credential information for verifying the static and dynamic passwords, resulting in a potential possibility that the user credential information is illegally captured. Therefore, the security of the existing identity verification methods is not good enough, and there is a need for a new scheme to address the above problems.

SUMMARY

Embodiments of the present invention provide a user identity verification method and system, a password protection apparatus and a storage medium, to improve the security of user identity verification.

To address the above problems, the embodiments of the present invention provide the following schemes.

In an aspect, an embodiment of the present invention provides a user identity verification method, including:

receiving, by a password protection apparatus, an operation request sent by a user via a user terminal, wherein the operation request contains a user identity of the user;

generating, by the password protection apparatus, identity verification information according to the user identity;

sending, by the password protection apparatus, the identity verification information to an NFC terminal through near field communication with the NFC terminal, so that the NFC terminal prompts the user to provide identity acknowledgement;

receiving, by the password protection apparatus, identity acknowledgement information from the NFC terminal through the near field communication with the NFC terminal, if the identity acknowledgement is provided by the user, wherein the identity acknowledgement information contains an identifier of the NFC terminal used by the user;

determining, by the password protection apparatus, whether the user identity matches the identifier of the NFC terminal according to the identity acknowledgement information; and sending, by the password protection apparatus, operation response information to the user terminal used by the user if the user identity matches the identifier of the NFC terminal, wherein the operation response information is used to inform the user about the passage of the user through the identity verification.

In another aspect, an embodiment of the present invention provide a password protection apparatus, including:

a request information receiving module, configured to receive an operation request sent by a user via a user terminal, wherein the operation request contains a user identity of the user;

a verification information generating module, configured to generate identity verification information according to the user identity;

a verification information sending module, configured to send the identity verification information to an NFC terminal through near field communication with the NFC terminal, so that the NFC terminal prompts the user to provide identity acknowledgement;

an acknowledgement information receiving module, configured to receive identity acknowledgement information from the NFC terminal through the near field communication with the NFC terminal, if the identity acknowledgement is provided by the user, wherein the identity acknowledgement information contains an identifier of the NFC terminal used by the user;

an identity verifying module, configured to determine whether the user identity matches the identifier of the NFC terminal according to the identity acknowledgement information; and a response information sending module, configured to send operation response information to the user terminal used by the user if the user identity matches the identifier of the NFC terminal, wherein the operation response information is used to inform the user about the passage of the user through the identity verification.

In still another aspect, an embodiment of the present invention provide a user identity verification system, including:

a password protection apparatus and an NFC terminal, where, the password protection apparatus includes:

a request information receiving module, configured to receive an operation request sent by a user via a user terminal, wherein the operation request contains a user identity of the user;

a verification information generating module, configured to generate identity verification information according to the user identity;

a verification information sending module, configured to send the identity verification information to the NFC terminal through near field communication with the NFC terminal, so that the NFC terminal prompts the user to provide identity acknowledgement;

an acknowledgement information receiving module, configured to receive identity acknowledgement information from the NFC terminal through the near field communication with the NFC terminal, if the identity acknowledgement is provided by the user, wherein the identity acknowledgement information contains an identifier of the NFC terminal used by the user;

an identity verifying module, configured to determine whether the user identity matches the identifier of the NFC terminal according to the identity acknowledgement information; and a response information sending module, configured to send operation response information to the user terminal used by the user if the user identity matches the identifier of the NFC terminal, wherein the operation response information is used to inform the user about the passage of the user through the identity verification.

In yet another aspect, an embodiment of the present invention provide a storage medium containing computer executable instructions, where the computer executable instructions, when executed by a computer processor, are configured to perform a user identity verification method including steps of:

receiving, by a password protection apparatus, an operation request sent by a user via a user terminal, wherein the operation request contains a user identity of the user;

generating, by the password protection apparatus, identity verification information according to the user identity;

sending, by the password protection apparatus, the identity verification information to an NFC terminal through near field communication with the NFC terminal, so that the NFC terminal prompts the user to provide identity acknowledgement;

receiving, by the password protection apparatus, identity acknowledgement information from the NFC terminal through the near field communication with the NFC terminal, if the identity acknowledgement is provided by the user, wherein the identity acknowledgement information contains an identifier of the NFC terminal used by the user;

determining, by the password protection apparatus, whether the user identity matches the identifier of the NFC terminal according to the identity acknowledgement information; and sending, by the password protection apparatus, operation response information to the user terminal used by the user if the user identity matches the identifier of the NFC terminal, wherein the operation response information is used to inform the user about the passage of the user through the identity verification.

In the embodiments of the present invention, when receiving an operation request that is sent by a user via a user terminal, the password protection apparatus generates identity verification information and transmits the generated identity verification information to an NFC terminal through the near field communication with the NFC terminal; if the user provides identity acknowledgement to the NFC terminal, the password protection apparatus receives identity acknowledgement information from the NFC terminal, and verifies whether the user identity of the user matches the identifier of the NFC terminal used by the user (that is carried in the identity acknowledgement information); and if the user identity of the user matches the identifier of the NFC terminal used by the user, the password protection apparatus informs the user about the passage by the user through the identity verification. Because the identity verification is implemented by determining whether the identifier of the NFC terminal matches the user identity, without inputting identity credential information by the user, user input operations are reduced for the convenience of the user, and the theft of the identity credential information of the user may be avoided, therefore, the security of user identity verification is improved, and the intercepting and phishing of the user identity credential information by Trojan horses is effectively prevented.

BRIEF DESCRIPTION OF THE DRAWINGS

In order to more clearly illustrate the technical solutions in embodiments of the present invention, accompanying drawings used for the description of the embodiments are briefly described here. It may be understood that the drawings accompanying to the following description illustrate only some embodiments of the invention, and other drawings may be obtained by those skilled in the art in light of the accompanying drawings.

DETAILED DESCRIPTION OF THE EMBODIMENTS

Embodiments of the present invention provide a method and system for verifying a user identity, a password protection apparatus, and a storage medium, to improve the security in verifying the user identity.

To make features and advantages of the present invention more apparent, technical solutions of the embodiments of the present invention will be clearly and completely described below in combination with the accompanying drawings. It should be noted that the embodiments of the present invention and features therein can be combined with each other if no conflict arises. The described particular embodiments are provided merely for explaining the disclosure, but not limiting the disclosure.

It is noted that, terms like "include", "comprise" and variants thereof mean inclusion without exclusion, such that a process, method, system, product or device including a series of elements is not necessarily limited to those elements, but may also include other elements not listed, or elements inherent to the process, method, system, product or device.

Solutions of the present invention are hereinafter described in detail.

A user identity verification method according to an embodiment of the present invention may include: receiving, by a password protection apparatus, an operation request containing a user identity of a user sent by the user via a user terminal; generating, by the password protection apparatus, identity verification information according to the user identity; sending, by the password protection apparatus, the identity verification information to a Near Field Communication (NFC) terminal through near field communication with the NFC terminal, so that the NFC terminal prompts the user to provide identity acknowledgement; receiving, by the password protection apparatus, identity acknowledgement information from the NFC terminal through the near field communication with the NFC terminal, if the identity acknowledgement is provided by the user, where the identity acknowledgement information contains an identifier of the NFC terminal used by the user; determining, by the password protection apparatus, whether the user identity matches the identifier of the NFC terminal according to the identity acknowledgement information; and sending, by the password protection apparatus, operation response information to the user terminal of the user if the user identity matches the identifier of the NFC terminal, where the operation response information is used to inform the user about the passage through the identity verification.

Figure 1:
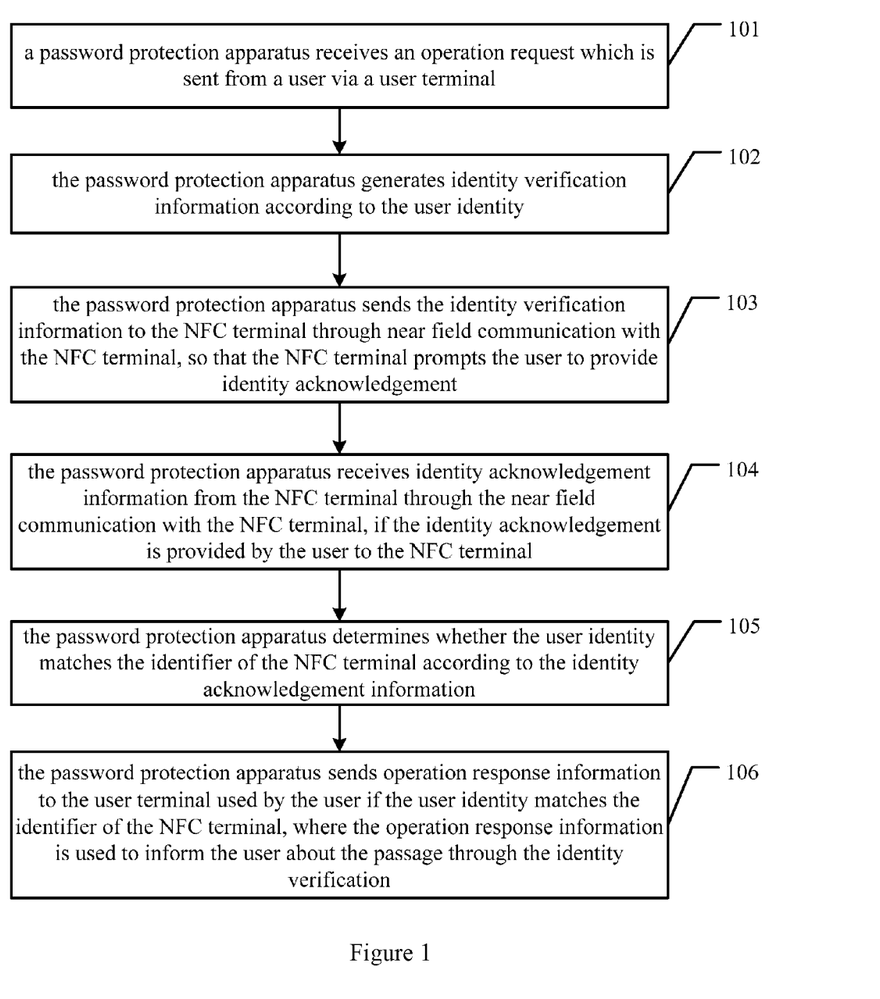
FIG. 1 is schematic flowchart of a user identity verification method according to an embodiment of the present invention is.

Referring to FIG. 1, an embodiment of the present invention provides a user identity verification method including Steps 101, 102, 103, 104, 105, and 106 below.

At Step 101, a password protection apparatus receives an operation request which is sent from a user via a user terminal.

The operation request may include a user identity (ID) of the user.

In the present embodiment, the operation request may be initiated by the user for a variety of sensitive operations on online applications conducted by the user via the user terminal, e.g., purchasing a product by the user via the user terminal over a network, transferring equipment of an online game character by the user via the user terminal over a network, and so on. For such sensitive operations initiated by the user, the password protection apparatus will verify the user identity of the user initiating these sensitive operations, to prevent the security risk of the user account caused by cheating behaviors including phishing and transaction information tampering which induce the user to participate in identity verification. Herein, the user terminal used by the user is not limited, and may be one with a network communication function such as a mobile phone, a personal computer, and a tablet PC.

In the present embodiment, when a sensitive operation is initiated by a user, the password protection apparatus is employed to verify the identity of the user. The operation request initiated by the user contains the user identity of the user, so that the password protection apparatus may be aware of which user will undergo the identity verification according to the user identity in the operation request.

In some embodiments of the present invention, it shall be noted that, before the password protection apparatus receives the operation request which is sent from the user via the user terminal, the method may further include steps of:

authenticating, by the password protection apparatus, the user identity of the user over the network;

receiving, by the password protection apparatus, an identifier of the NFC terminal and the identity credential pertaining to the user which are sent by the user via the user terminal, after the successful authentication of the user identity;

verifying, by the password protection apparatus, the identity credential using an authentication algorithm; and establishing, by the password protection apparatus, a binding relationship between the user identity of the user and the identifier of the NFC terminal, after the successful verification of the identity credential.

Generally, in an initialization process of the password protection apparatus, the password protection apparatus authenticates the user (for example, by authenticating user information such as a username and a password), and after the successful authentication, the password protection apparatus establishes in advance the binding relationship between a user identity of the user and the identifier of the NFC terminal used by the user that is sent by the user. For example, the NFC terminal may be an NFC mobile phone which is used by a user A for the authentication of a user identity of the user A, in this case, a binding relationship between the user identity of the user A and an identifier of the NFC mobile phone is established in advance in the password protection apparatus. Then in the subsequent authenticate of the user identity of the user A, only if the user identity of the user A and the identifier of the NFC mobile phone match the binding relationship established in advance, the password protection apparatus informs the user A about the passage through the authentication. In the present embodiment, the NFC terminal refers to an electronic device having an NFC function.

It is further noted that, in the present embodiment, the same terminal may function as both the user terminal and the NFC terminal. For example, an NFC mobile phone used by the user may function as both the user terminal and the NFC terminal, in this case, an identifier of the NFC mobile phone is sent by the user to the password protection apparatus, in which a binding relationship between the user identity of the user and the identifier of the NFC mobile phone is established; subsequently, the user still uses the NFC mobile phone to send an operation request to the password protection apparatus. Alternatively, the user terminal may be different from the NFC terminal. For example, the user terminal is a portable computer and the NFC terminal is an NFC mobile phone, in this case, the password protection apparatus establishes a binding relationship between the user identity and an identifier of the NFC mobile phone, but the user sends an operation request to the password protection apparatus via the portable computer.

At Step 102, the password protection apparatus generates identity verification information according to the user identity.

In the present embodiment, after receiving the operation request from the user, the password protection apparatus generates the identity verification information in relation to the user according to the user identity carried in the operation request.

Herein, the identity verification information, or referred to as identity verification request information, is used to prompt the user to return identity acknowledgement information containing the identifier of the NFC terminal via the NFC terminal.

At Step 103, the password protection apparatus sends the identity verification information to the NFC terminal through near field communication with the NFC terminal, so that the NFC terminal prompts the user to provide identity acknowledgement.

In the present embodiment, after generating the identity verification information in relation to the user, the password protection apparatus communicates with the NFC terminal via near field communication to send the generated identity verification information to the NFC terminal. After receiving the identity verification information through the near field communication, the NFC terminal displays the identity verification information to the user, and if the user actually initiated the operation request to the password protection apparatus, the user will acknowledge the identity verification information to indicate that the operation request was initiated by the user. However, if the operation request was initiated to the password protection apparatus by a malicious Trojan horse masquerading as the user, not by the user, then when the NFC terminal used by the user displays the identity verification information to the user, the user will not acknowledge the identity verification information, thus the password protection apparatus will not receive the identity acknowledgement information from the NFC terminal and hence will not authenticate the operation request initiated by the malicious Trojan horse masquerading as the user, as a result, the malicious Trojan horse cannot steal user account information, and the password protection apparatus can ensure the security of the network account of the user.

In the prior art, after a user initiates an operation request, the identity of the user is verified immediately by for example a static or dynamic password; in this case, if a malicious Trojan horse illegally obtains identity credential information of the user, the malicious Trojan horse can pass through the verification successfully with the illegally obtained identity credential information and then compromises the security of the network account of the user. In the present embodiment, however, after generating the identity verification information, the password protection apparatus will not immediately verify the user identity with the user, instead, the password protection apparatus sends identity verification information to the NFC terminal used by the user, and the user is required to provide identity acknowledge or not depending on whether the user actually initiated the operation request, without requesting the user to input identity credential information, to avoid the malicious theft of the identity credential information. In addition, even if a malicious Trojan horse illegally obtains identity credential information of a user, the malicious Trojan horse masquerading as the user cannot be authenticated by the password protection apparatus successfully because the password protection apparatus does not verify the identity credential information of the user, therefore the malicious theft of the identity credential information of the user will not compromise the security of the network account of the user.

In some embodiments of the present invention, the password protection apparatus sends the identity verification information to the NFC terminal via near field communication with the NFC terminal in such a way that the identity verification information is sent to the NFC terminal by an NFC module of the password protection apparatus. That is, the password protection apparatus is provided with the NFC module which is configured to send the identity verification information to an NFC terminal close to the password protection apparatus if a distance between the NFC terminal and the password protection apparatus meets the distance requirements regulated by NFC protocols. As such, the NFC module of the password protection apparatus enables the near field communication between the password protection apparatus and the NFC terminal, as long as the password protection apparatus is close enough to the NFC terminal used by the user, so that the user needs not to input identity credential information for the purpose of identity verification, to avoid the malicious theft of the identity credential information.

In other embodiments of the present invention, the password protection apparatus sends the identity verification information to the NFC terminal via near field communication with the NFC terminal in such a way that: the identity verification information is sent, via a network, from the password protection apparatus to an NFC information exchange device, which in turn sends the identity verification information to the NFC terminal via near field communication with the NFC terminal. That is, the password protection apparatus in these embodiments of the present invention may be remote from the NFC terminal used by the user, and the NFC module in the password protection apparatus is removed from the password protection apparatus and deployed as an independent NFC information exchange device close to the NFC terminal, so that the password protection apparatus can remotely send the identity verification information to the NFC information exchange device via the network, and then the NFC information exchange device in turn communicates with the NFC terminal via near field communication to send the identity verification information to the NFC terminal. Thus, the password protection apparatus may be embodied flexibly in the embodiment, and such way is more extensively employed in practice.

At Step 104, the password protection apparatus receives identity acknowledgement information from the NFC terminal through the near field communication with the NFC terminal, if the identity acknowledgement is provided by the user to the NFC terminal.

The identity acknowledgement information contains the identifier of the NFC terminal used by the user.

In the present embodiment, after receiving the identity verification information sent from the password protection apparatus, the NFC terminal prompts the user to provide identity acknowledgement. The user will provide identity verification acknowledgement as requested by the NFC terminal if the user actually initiated the operation request. After receiving the identity acknowledgement provided by the user, the NFC terminal sends the identity acknowledgement information to the password protection apparatus through the near field communication with the password protection apparatus, where the identity acknowledge information contains the identifier of the NFC terminal.

In some embodiments of the present invention, in the case that the NFC module is provided in the password protection apparatus, Step 104 may include: receiving, by the NFC module of the password protection apparatus, the identity acknowledgement information sent from the NFC terminal.

In some other embodiments of the present invention, in the case that the password protection apparatus communicates with the NFC information exchange device through the network, Step 104 may include: when the identity acknowledgement information is received by the NFC information exchange device via the near field communication with the NFC terminal, receiving, by the password protection apparatus, the identity acknowledgement information from the NFC information exchange device via the network.

At Step 105, the password protection apparatus determines whether the user identity matches the identifier of the NFC terminal according to the identity acknowledgement information.

In the present embodiment, after receiving the identity acknowledgement information from the NFC terminal through the near field communication with the NFC terminal, the password protection apparatus determines whether the user identity of the user initiating the operation request matches the identifier of the NFC terminal carried in the identity acknowledge information. Here, the password protection apparatus may be provided with a user information database, in which information of identities of users, as well as a binding relationship between an identifier of an NFC terminal used by each user and the identity of the user, are stored. The password protection apparatus verifies whether the user identity matches the identifier of the NFC terminal according to the identity acknowledgement information in such a way that: the password protection apparatus determines whether a binding relationship between the user identity and the identifier of the NFC terminal has been established, and if so, determines that the user identity matches with the identifier of the NFC terminal; otherwise, determines that the user identity mismatches with the identifier of the NFC terminal.

Specifically, after receiving the identity acknowledgement information, the password protection apparatus extracts from the user information database an NFC terminal identifier bound to the user identity of the user initiating the operation request and verifies whether the extracted NFC terminal identifier is identical to the NFC terminal identifier carried in the received identity acknowledgement information; and if so, the password protection apparatus determines that a binding relationship between the user identity and the NFC terminal identifier carried in the received identity acknowledgement information has already been established, which indicates that the user identity matches the NFC terminal identifier carried in the received identity acknowledgement information; otherwise, if an NFC terminal identifier bound to the user identity of the user initiating the operation request is unavailable in the user information database, the password protection apparatus determines that a binding relationship between the user identity and the NFC terminal identifier carried in the received identity acknowledgement information has not been established, which indicates that the user identity mismatches the NFC terminal identifier carried in the received identity acknowledgement information.

In the present embodiment, when an NFC terminal is in near field communication with the password protection apparatus, the password protection apparatus sends identity verification information to the NFC terminals. For example, in a case where a binding relationship between an identifier of an NFC terminal 1 and an identity of a user A is already stored in a user information database of the password protection apparatus and the NFC terminal 1 is used by the user A initiating an operation request, if two NFC terminals including the NFC terminal 1 and an NFC terminal 2 are in the near field communication with the password protection apparatus, the password protection apparatus sends identity verification information to both the NFC terminal 1 and the NFC terminal 2; if the user A provides identity acknowledgement to the NFC terminal 1 after the NFC terminal 1 displays the identity verification information to the user A, the NFC terminal 1 sends identity acknowledgement information 1' containing an identifier of the NFC terminal 1 to the password protection apparatus through near filed communication; further, if the NFC terminal 2 also sends identity acknowledgement information 2' containing an identifier of the NFC terminal 2 to the password protection apparatus through the near field communication, then the password protection apparatus compares the user identity of the user A with the identifier of the NFC terminal 1 after receiving the identity acknowledgement information 1', and compares the user identity of the user A with the identifier of the NFC terminal 2 after receiving the identity acknowledgement information 2'; according to the binding relationships prestored in the user information database, the password protection apparatus determines that the user identity of the user A matches the identifier of the NFC terminal 1 considering that the NFC terminal 1 is used by the user A, and Step 105 is executed. However, if the operation request is initiated by another user (or a malicious Trojan horse) masquerading as the user A and an NFC terminal (e.g. the NFC terminal 2 in the present embodiment) other than the NFC terminal 1 used by the user A for identity acknowledgement, the password protection apparatus determines that the user identity of the user A mismatches the identifier of the NFC terminal 2 and thus will not pass the another user (or malicious Trojan horse) through the authentication.

At Step 106, the password protection apparatus sends operation response information to the user terminal used by the user if the user identity matches the identifier of the NFC terminal, where the operation response information is used to inform the user about the passage through the identity verification.

In the present embodiment of the invention, the password protection apparatus sends to the user the operation response information if the user identity matches the identifier of the NFC terminal, to inform the user via the operation response information that the user has passed through the identity verification. In an implementation, if the user identity mismatches the identifier of the NFC terminal, the password protection apparatus will not inform the user about the passage through the identity verification, and refuses the operation request initiated by the user, to effectively protect the security of the network account.

As can be seen from the above description of the embodiment of the present invention, when receiving an operation request that is sent by a user via a user terminal, the password protection apparatus generates identity verification information and transmits the generated identity verification information to an NFC terminal through the near field communication with the NFC terminal; if the user provides identity acknowledgement to the NFC terminal, the password protection apparatus receives identity acknowledgement information from the NFC terminal, and verifies whether the user identity of the user matches the identifier of the NFC terminal used by the user (that is carried in the identity acknowledgement information); and if the user identity of the user matches the identifier of the NFC terminal used by the user, the password protection apparatus informs the user about the passage by the user through the identity verification. Because the identity verification is implemented by determining whether the identifier of the NFC terminal matches the user identity, without inputting identity credential information by the user, user input operations are reduced for the convenience of the user, and the theft of the identity credential information of the user may be avoided, therefore, the security of user identity verification is improved, and the intercepting and phishing of the user identity credential information by Trojan horses is effectively prevented.

For better understanding and implementing of the scheme of the embodiment of the present invention described above, the following description is given with an exemplary application scenario.

Figure 2:
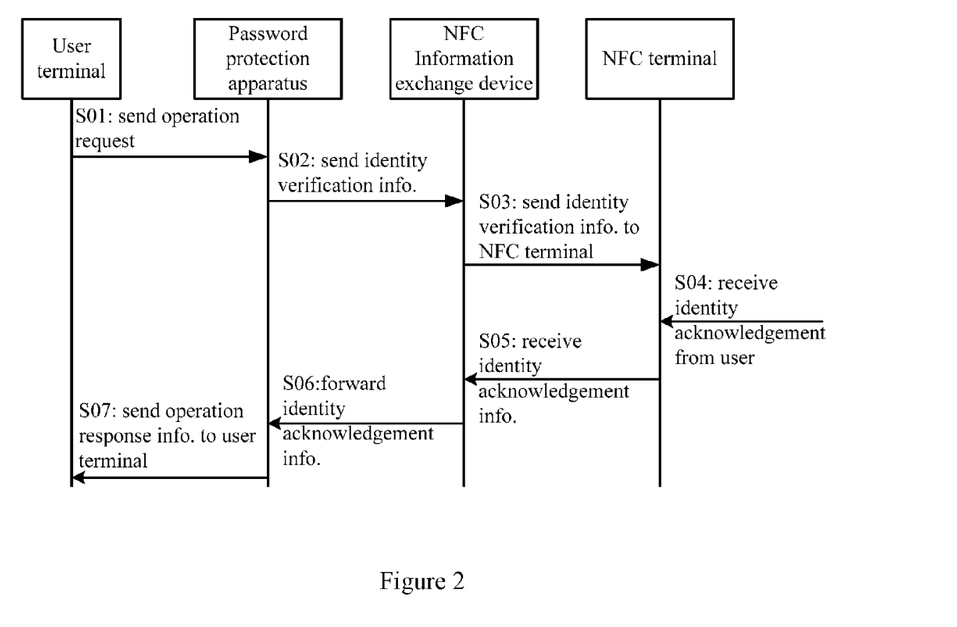
FIG. 2 is a schematic diagram showing signaling interactions in the user identity verification method according to an embodiment of the present invention.

Referring to FIG. 2 which is a schematic diagram showing a user identity authentication system embodying the user identity verification method and signaling interactions therein according to an embodiment of the present invention, and the user identity authentication system includes a user terminal, a password protection apparatus, an NFC information exchange device, and an NFC terminal, for example. The user identity verification method may include the following Steps S01, S02, S03, S04, S05, S06 and S07.

At Step S01, when a user initiates a sensitive operation on a user terminal, an operation request is sent to the password protection apparatus from the user terminal, where the operation request includes a user identity of the user.

For example, if a user initiates a sensitive operation such as equipment transferring or online consumption, then an operation request is sent to the password protection apparatus, but at this time, the operation request is not yet authenticated by the password protection apparatus, and hence the sensitive operation initiated by the user does not yet come into effect.

At Step S02, the password protection apparatus generates identity verification information, and sends the generated identity verification information to the NFC information exchange device via a network.

Here, the password protection apparatus is arranged remotely from the NFC terminal used by the user, and is connected with the NFC information exchange device over the network. After generating the identity verification information, the password protection apparatus sends the generated identity verification information to the NFC information exchange device.

It shall be noted that, in some other embodiments of the present invention, the password protection apparatus may be provided with an NFC module, and the password protection apparatus is physically close to the NFC terminal, so that the NFC module of the password protection apparatus may be used to send the identity verification information to the NFC terminal.

At Step S03, the NFC information exchange device sends the identity verification information to the NFC terminal through a near field communication connection with the NFC terminal.

In the present embodiment of the invention, the NFC information exchange device and the password protection apparatus are connected via the network, the NFC information exchange device sends the identity verification information to the NFC terminal through a near field communication connection with the NFC terminal, and the NFC information exchange device is physically close to the NFC terminal used by the user.

At Step S04, the NFC terminal receives identity acknowledgement provided by the user.

When receiving the identity verification information, the NFC terminal displays the received identity verification information to the user, and the user determines whether to provide identity acknowledgement depending on the context and/or time of the identity verification information. If the user actually initiated the operation request, the user will provide the identity acknowledgement to the NFC terminal.

At Step S05, the NFC terminal sends identity acknowledgement information containing the identifier of the NFC terminal used by the user to the NFC information exchange device.

The NFC terminal may send the identity acknowledgement information to the NFC information exchange device via a near field communication connection between the NFC terminal and the NFC information exchange device.

At Step S06, the NFC information exchange device forwards the identity acknowledgement information to the password protection apparatus through the network.

Here, the password protection apparatus is arranged remotely from the NFC terminal used by the user, and is connected with the NFC information exchange device via a network. After receiving, from the NFC terminal, the identity acknowledgement information provided by the user to the NFC terminal, the NFC information exchange device forwards the identity acknowledgement information to the password protection apparatus via the network.

At Step S07, the password protection apparatus verifies that the user identity matches the identifier of the NFC terminal, and sends operation response information to the user terminal used by the user, where the operation response information is used to inform the user about the passage of the user through the identity verification.

As indicated in the description of the user identity verification method, the password protection apparatus can be used to perform the following functions of:

(1) storing user identity information;

(2) storing the binding relationship between user identity information and the NFC terminal used by the user; and (3) verifying the sensitive operation initiated by the user, delivering information and authenticating the user identity.

The above function (2) of the password protection apparatus may be implemented as follows.

To enable the user to acknowledge the user identity via the NFC terminal, it is necessary to bind the NFC terminal with the user identity allocated to the user in the password protection apparatus. Initially, the password protection apparatus authenticates the user identity by a dynamic or static password, the user subsequently sends the identifier of the NFC terminal and identity credential information pertaining to the user to the password protection apparatus, which then verifies the identifier of the NFC terminal and authenticates the identity credential information by an authentication algorithm. If verifying the identifier of the NFC terminal and authenticating the identity credential information successfully, the password protection apparatus binds the user identity with the identifier of the NFC terminal, so that the NFC terminal used for verifying the user identity is successfully bound.

For better understanding of the above-described solution of the embodiment of the present invention, the apparatus suitable for the method provided in the above embodiments is provided below.

Figure 3A:
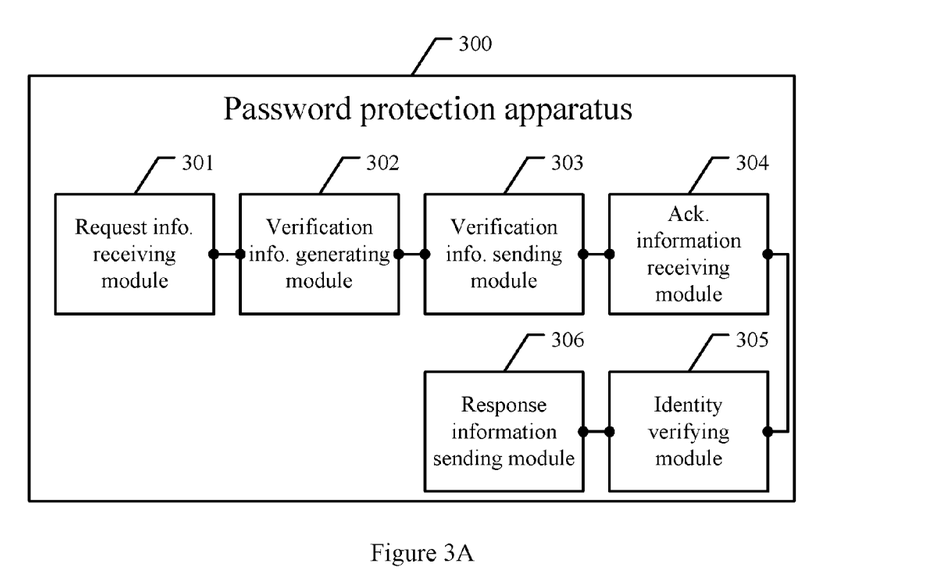
FIG. 3A is a schematic diagram showing the structure of a password protection apparatus according to an embodiment of the present invention.

Referring to FIG. 3A, an embodiment of the present invention provides a password protection apparatus 300 which includes: a request information receiving module 301, a verification information generating module 302, a verification information sending module 303, an acknowledgement information receiving module 304, an identity verifying module 305 and a response information sending module 306.

The request information receiving module 301 is configured to receive an operation request sent by a user via a user terminal, where the operation request contains a user identity of the user.

The verification information generating module 302 is configured to generate identity verification information according to the user identity.

The verification information sending module 303 is configured to send the identity verification information to an NFC terminal through near field communication with the NFC terminal, so that the NFC terminal prompts the user to provide identity acknowledgement.

The acknowledgement information receiving module 304 is configured to receive identity acknowledgement information from the NFC terminal through the near field communication with the NFC terminal, if the identity acknowledgement is provided by the user, where the identity acknowledgement information contains an identifier of the NFC terminal used by the user.

The identity verifying module 305 is configured to determine whether the user identity matches the identifier of the NFC terminal according to the identity acknowledgement information.

The response information sending module 306 is configured to send operation response information to the user terminal used by the user if the user identity matches the identifier of the NFC terminal, where the operation response information is used to inform the user about the passage of the user through the identity verification.

In some embodiments of the present invention, t the verification information sending module 303 is an NFC module, which is configured to send the identity verification information to the NFC terminal.

Specifically, the acknowledgement information receiving module 304 is the NFC module, which is further configured to receive the identity acknowledgement information sent from the NFC terminal.

In some other embodiments of the present invention, the verification information sending module 303 is particularly configured to: send the identity verification information to an NFC information exchange device via a network, so that the NFC information exchange device sends the identity verification information to the NFC terminal through near field communication with the NFC terminal.

Specifically, the acknowledgement information receiving module 304 is configured to: after the NFC information exchange device receives the identity acknowledgement information through the near field communication with the NFC terminal, receive the identity acknowledgement information sent from the NFC information exchange device via the network.

Figure 3B:
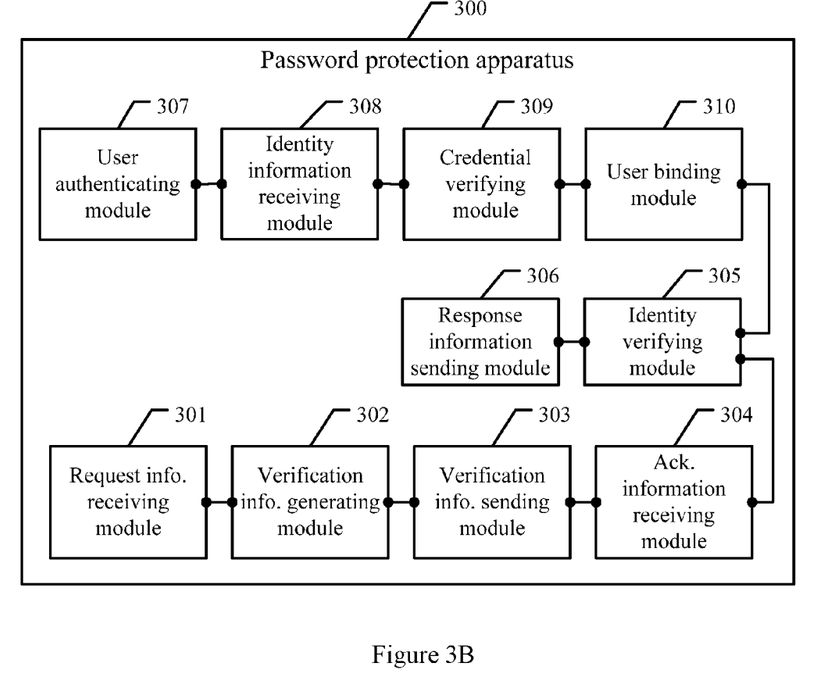
FIG. 3B is a schematic diagram showing the structure of another password protection apparatus according to an embodiment of the present invention.

Referring to FIG. 3B, in some embodiments of the present invention, the password protection apparatus 300 may also include:

a user authenticating module 307, configured to authenticate the user identity of the user over a network;

an identity information receiving module 308, configured to receive the identifier of the NFC terminal and an identity credential pertaining to the user which are sent by the user via the user terminal, after the successful authentication of the user identity;

a credential verifying module 309, configured to verify the identity credential using an authentication algorithm; and a user binding module 310, configured to establish a binding relationship between the user identity of the user and the identifier of the NFC terminal, after the successful verification of the identity credential.

The identity verifying module 305 is further configured to: determine whether the binding relationship between the user identity of the user and the identifier of the NFC terminal is established; and if the binding relationship between the user identity of the user and the identifier of the NFC terminal is established, determine that the user identity matches the identifier of the NFC terminal; otherwise, determine that the user identity mismatches the identifier of the NFC terminal.

As can be seen from the above description of the embodiment of the present invention, when receiving an operation request that is sent by a user via a user terminal, the password protection apparatus generates identity verification information and transmits the generated identity verification information to an NFC terminal through the near field communication with the NFC terminal; if the user provides identity acknowledgement to the NFC terminal, the password protection apparatus receives identity acknowledgement information from the NFC terminal, and verifies whether the user identity of the user matches the identifier of the NFC terminal used by the user (that is carried in the identity acknowledgement information); and if the user identity of the user matches the identifier of the NFC terminal used by the user, the password protection apparatus informs the user about the passage by the user through the identity verification. Because the identity verification is implemented by determining whether the identifier of the NFC terminal matches the user identity, without inputting identity credential information by the user, user input operations are reduced for the convenience of the user, and the theft of the identity credential information of the user may be avoided, therefore, the security of user identity verification is improved, and the intercepting and phishing of the user identity credential information by Trojan horses is effectively prevented.

Figure 4A:
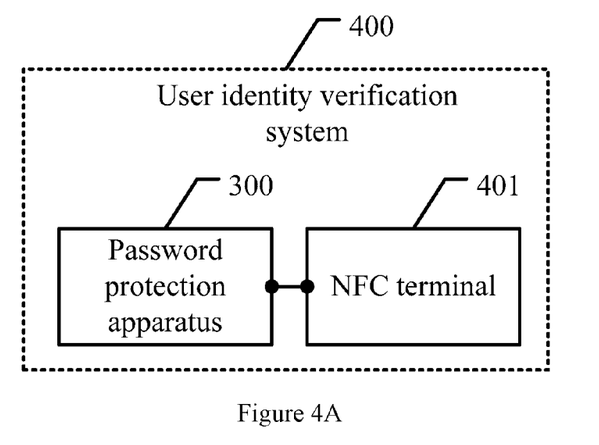
FIG. 4A is a schematic diagram showing the structure of a user identity verification system according to an embodiment of the present invention.

Referring to FIG. 4A, an embodiment of the present invention provide a user identity verification system 400 including a password protection apparatus 300 as shown in FIG. 3A or FIG. 3B and an NFC terminal 401.

The password protection apparatus 300 includes:

a request information receiving module, configured to receive an operation request sent by a user via a user terminal, wherein the operation request contains a user identity of the user;

a verification information generating module, configured to generate identity verification information according to the user identity;

a verification information sending module, configured to send the identity verification information to the NFC terminal 401 through near field communication with the NFC terminal 401, so that the NFC terminal 401 prompts the user to provide identity acknowledgement;

an acknowledgement information receiving module, configured to receive identity acknowledgement information from the NFC terminal 401 through the near field communication with the NFC terminal 401, if the identity acknowledgement is provided by the user, wherein the identity acknowledgement information contains an identifier of the NFC terminal 401 used by the user;

an identity verifying module, configured to determine whether the user identity matches the identifier of the NFC terminal according to the identity acknowledgement information; and a response information sending module, configured to send operation response information to the user terminal used by the user if the user identity matches the identifier of the NFC terminal, wherein the operation response information is used to inform the user about the passage of the user through the identity verification.

In some embodiments of the present invention, the verification information sending module is an NFC module.

The NFC module is configured to send the identity verification information to the NFC terminal 401.

The acknowledgement information receiving module may be the NFC module, and the NFC module is further configured to receive the identity acknowledgement information sent from the NFC terminal 401.

In some embodiments of the present invention, the password protection apparatus 300 further includes:

a user authenticating module, configured to authenticate the user identity of the user over a network;

an identity information receiving module, configured to receive the identifier of the NFC terminal 401 and an identity credential pertaining to the user which are sent by the user via the user terminal, after the successful authentication of the user identity;

a credential verifying module, configured to verify the identity credential using an authentication algorithm; and a user binding module, configured to establish a binding relationship between the user identity of the user and the identifier of the NFC terminal 401, after the successful verification of the identity credential.

The identity verifying module may be further configured to: determine whether the binding relationship between the user identity of the user and the identifier of the NFC terminal 401 is established; and if the binding relationship between the user identity of the user and the identifier of the NFC terminal 401 is established, determine that the user identity matches the identifier of the NFC terminal 401; otherwise, determine that the user identity mismatches the identifier of the NFC terminal 401.

Figure 4B:
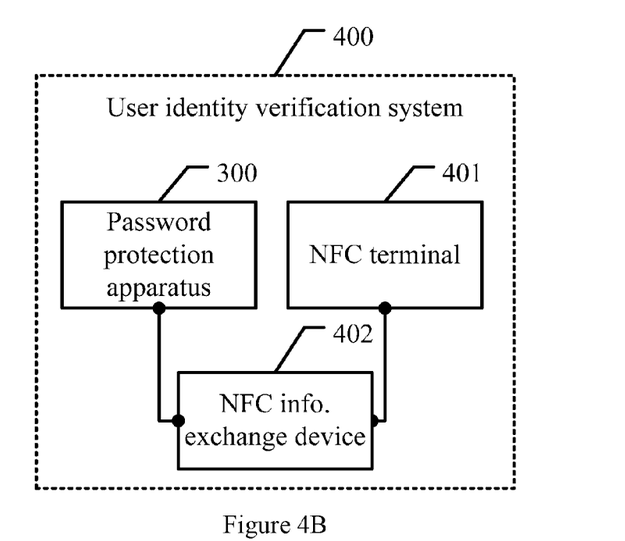
FIG. 4B is a schematic diagram showing the structure of another user identity verification system according to an embodiment of the present invention.

Alternatively, referring to FIG. 4B, the user identity verification system 400 may include: the password protection apparatus 300 as shown in FIG. 3A or 3B, the NFC terminal 401, and an NFC information exchange device 402, where the password protection apparatus 300 is connected with the NFC information exchange device 402 via a network.

The verification information sending module is configured to send the identity verification information to the NFC information exchange device 402 via the network.

The NFC information exchange device 402 is configured to send the identity verification information to the NFC terminal 401 through the near field communication with the NFC terminal 401.

The NFC information exchange device 402 is further configured to receive the identity acknowledgement information from the NFC terminal 401 through the near field communication with the NFC terminal 401.

The acknowledgement information receiving module is configured to receive the identity acknowledgement information sent from the NFC information exchange device 402 via the network.

As can be seen from the above description of the embodiment of the present invention, when receiving an operation request that is sent by a user via a user terminal, the password protection apparatus generates identity verification information and transmits the generated identity verification information to an NFC terminal through the near field communication with the NFC terminal; if the user provides identity acknowledgement to the NFC terminal, the password protection apparatus receives identity acknowledgement information from the NFC terminal, and verifies whether the user identity of the user matches the identifier of the NFC terminal used by the user (that is carried in the identity acknowledgement information); and if the user identity of the user matches the identifier of the NFC terminal used by the user, the password protection apparatus informs the user about the passage by the user through the identity verification. Because the identity verification is implemented by determining whether the identifier of the NFC terminal matches the user identity, without inputting identity credential information by the user, user input operations are reduced for the convenience of the user, and the theft of the identity credential information of the user may be avoided, therefore, the security of user identity verification is improved, and the intercepting and phishing of the user identity credential information by Trojan horses is effectively prevented.

An embodiment of the present invention further provides a storage medium containing computer executable instructions, wherein the computer executable instructions, when executed by a computer processor, are configured to perform a user identity verification method including steps of:

receiving, by a password protection apparatus, an operation request sent by a user via a user terminal, wherein the operation request contains a user identity of the user;

generating, by the password protection apparatus, identity verification information according to the user identity;

sending, by the password protection apparatus, the identity verification information to an NFC terminal through near field communication with the NFC terminal, so that the NFC terminal prompts the user to provide identity acknowledgement;

receiving, by the password protection apparatus, identity acknowledgement information from the NFC terminal through the near field communication with the NFC terminal, if the identity acknowledgement is provided by the user, wherein the identity acknowledgement information contains an identifier of the NFC terminal used by the user;

determining, by the password protection apparatus, whether the user identity matches the identifier of the NFC terminal according to the identity acknowledgement information; and sending, by the password protection apparatus, operation response information to the user terminal used by the user if the user identity matches the identifier of the NFC terminal, wherein the operation response information is used to inform the user about the passage of the user through the identity verification.

The user identity verification method performed by the computer-executable instructions executed by a computer processor is not limited to the above steps, but may further include operations of the user identity verification method provided in any of the embodiments of the present invention.

The user identity verification method according to the embodiment of the invention may be applied to a terminal as follows, and the terminal may be a smart phone, a tablet PC, an e-book reader, a Moving Picture Experts Group Audio Layer III (MP3) player, a Moving Picture Experts Group Audio Layer IV (MP4) player, a portable laptop computer or desktop computer.

Figure 5:
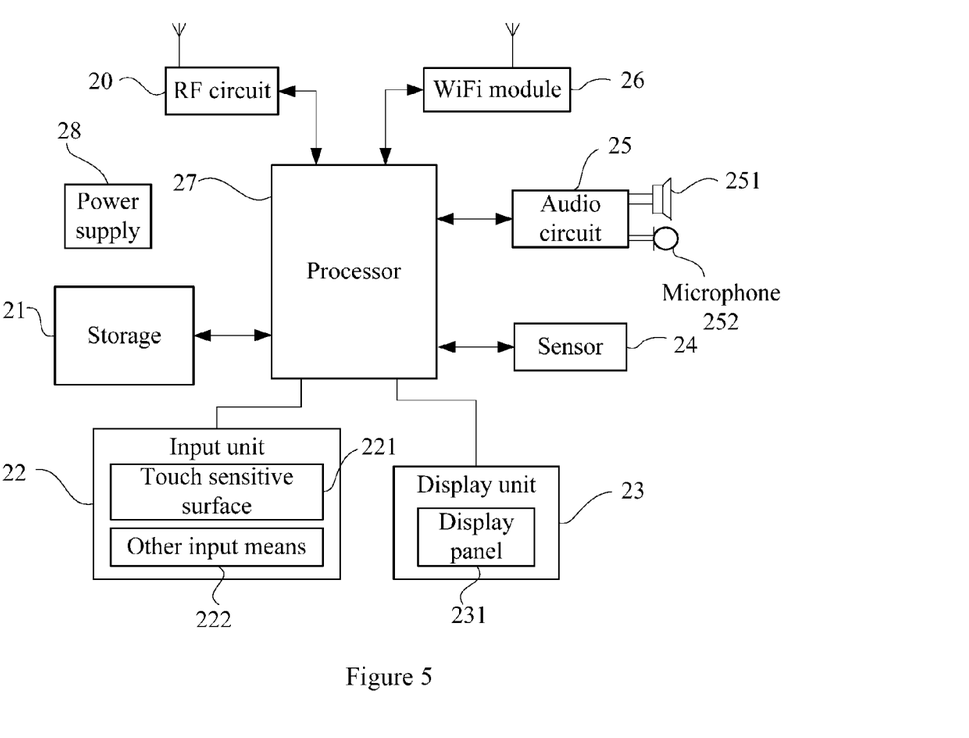
FIG. 5 is a schematic block diagram showing a user terminal embodying the user identity verification method according to an embodiment of the present invention.

FIG. 5 is a schematic view showing a structure of a terminal suitable for the embodiment of the present invention.

The terminal may include a Radio Frequency (RF) circuit 20, a storage 21 including one or more computer-readable storage medium, an input unit 22, a display unit 23, a sensor 24, an audio circuit 25, a wireless fidelity (WiFi) module 26, a processor 27 including one or more processing cores, a power supply 28 and the like. Those skilled in the art will appreciate that the terminal is not limited to the structure shown in FIG. 5, instead, the terminal may include more or less components, or a combination of some of the components, or the terminal may have a different arrangement of its components.

The RF circuit 20 may be configured to transmit or receive information, or transmit or receive signals, and particularly may be configured to receive downlink information from a base station and deliver the received downlink information to one or more processor 27 for processing. Further, the RF circuit 20 is configured to transmit uplink data to the base station. Typically, the RF circuit 20 includes, but not limited to an antenna, at least one amplifier, a tuner, one or more oscillators, a subscriber identity module (SIM) card, a transceiver, a coupler, a low noise amplifier (LNA) and a diplexer. In addition, the RF circuit 20 may also communicate with the network and other devices by wireless communication. The wireless communication can be based on any communications standards or protocols, including, but not limited to: Global System for Mobile Communications (GSM), General Packet Radio Service (GPRS), Code Division Multiple Access (CDMA), wideband CDMA (WCDMA), long term evolution (LTE), e-mail or short message service (SMS) and the like.

The storage 21 may store software programs and modules, which may be executed by the processor 27 to implement various functions and data processing. The memory 21 may include a program storage area and a data storage area. The program storage area is used to store an operating system and an application program for implementing at least one function (such as a sound playback function, an image display function, etc.), and the data storage area is used to store data (such as audio data, a contact book) created in the use of the terminal. Further, the storage 21 may include a high-speed random access memory (RAM), which may be a non-volatile memory such as at least one disk storage device, a flash memory device, or other volatile solid-state memory devices. Accordingly, the storage 21 may include a storage controller to allow the processor 27 and the input unit 22 to access the storage 21.

The input unit 22 may be used to receive inputted digital or character information, and generate a signal input of keyboard, mouse, joystick or trackball related to user settings and function control. Specifically, in a particular embodiment, the input unit 22 includes a touch sensitive surface 221 and other input means 222. The touch sensitive surface 221, also known as a touch screen or touch panel, is used to capture a touch operation on or near the touch sensitive surface 221 (such as an operation of the user performed on or near the touch sensitive surface 221 using a finger, a touch pen, or any other suitable object or accessories), and drive the corresponding connection device according to a preset program. Optionally, the touch sensitive surface 221 may include touch detection means and a touch controller. The touch detection means is configured to detect a touch position of a user touch operation, detect a signal caused by the touch operation, and send the signal to the touch controller; the touch controller receives touch information from the touch detection means, converts the same into contact coordinates which are then sent to the processor 27, and receive and execute commands from the processor 27. Further, there may be resistive, capacitive, and infrared touch sensitive surfaces 221, or the touch sensitive surfaces 221 may implemented based on surface acoustic wave. In addition to the touch sensitive surface 221, the input unit 22 may also include other input means 222. Specifically, the other input means 222 may include, but is not limited to a physical keyboard, function keys (such as volume control keys, switch keys, etc.), a trackball, a mouse, a joystick, or a combination of at least two thereof.

The display unit 23 may be used to display information input by the user, or information provided to the user, and a variety of graphical user interfaces on the terminal, and the graphical user interfaces may consist of graphics, text, icons, video, and any combination thereof. The display unit 23 may include a display panel 231, which may be optionally configured by a liquid crystal display (LCD), organic light emitting diodes (OLEDs) configured to form a display panel 231. Further, the touch sensitive surface 221 may cover the display panel 231. When the touch sensitive surface 221 detects a touch operation on or near the touch sensitive surface 221, the touch sensitive surface 221 sends the detected touch operation to the processor 27 to determine the type of the touch event, then the processor 27 provide visual outputs on the display panel 231 depending on the type of the touch event. Although the touch sensitive surface 221 and the display panel 231 are shown in FIG. 5 as two separate components to perform input and output functions, respectively, in some other embodiments, the touch sensitive surface 221 may be integrated with the display panel 231 to achieve both the input and output functions.

The terminal may also include at least one sensor 24, such as an optical sensor, a motion sensor and other sensors. Specifically, the optical sensor may include an ambient light sensor and a proximity sensor, where the ambient light sensor is used to adjust the illumination of the display panel 231 according to the ambient brightness, and the proximity sensor may be configured to turn off the display panel 231 and/or backlight when the terminal is close to the ear. As one of motion sensors, a gravity acceleration sensor may detect the size of the acceleration in the respective directions (typically three axis directions) in motion, and detect the size and direction of gravity in a static state, and thus may be used in a mobile phone gesture recognizing application (for switching between horizontal and vertical screens, games, magnetometer attitude calibration, and the like), a vibration recognizing function (such as a pedometer, percussion) and the like. The terminal can be further configured with a gyroscope, a barometer, a hygrometer, a thermometer, an infrared sensor, and the like, which will not be described in detail herein.

The audio circuit 25, a speaker 251 and a microphone 252 provide an audio interface between a user and the terminal. The audio circuit 25 is configured to convert received audio data to an electrical signal, and transmit the electrical signal to the speaker 251, which then converts the electrical signal as a sound signal for outputting; on the other hand, the microphone 252 converts the collected sound signal into an electric signal, which is received and then converted into audio data by the audio circuit 25, and then the audio data is outputted to the processor 27 after processing and then sent to another terminal via the RF circuit 20, or the audio data is outputted to the storage 21 for further processing. The audio circuit 25 may also include an earplug receiving hole, which is used for communication between a headset and the terminal.

WiFi is a short-range wireless transmission technology. Through a WiFi module 26, the terminal may be used by a user to send and receive emails, browse webpages, access streaming media, etc., because WiFi provides wireless broadband Internet access for the user. Although FIG. 5 shows a WiFi module 26, it is understood that the WiFi module 26 is not necessarily a part of the terminal, and may be omitted without changing the nature and scope of the invention as desired.

The processor 27 represents a control center of the terminal, and is connected to the various parts of the mobile phone through a variety of interfaces and connections. By running or executing a software program and/or module stored in the storage 21, and invoking data stored in the storage 21, the processor 27 can implement various functions of the terminal and process data, and thus monitor overall the mobile phone. Optionally, the processor 27 may include one or more processing cores. In an implementation, the processor 27 is integrated with an application processor and a modem processor, where the application processor executes the operating system, user interfaces and application programs, and the modem processor deals with wireless communication. It may be appreciated that the modem processor may not be integrated into the processor 27.

Each terminal further includes a power supply 28 (such as a battery) for providing power to its various parts. The power supply 28 may be coupled to the processor 27 via a power management system, to implement functions such as charge management, discharge management and power consumption management through the power management system. The power supply 28 may include one or more AC or DC power, a recharging system, a power failure detection circuit, a power converter or inverter, a power status indicator, and other components.

Although not shown, the terminal may also include a camera and/or Bluetooth module, which are not discussed in detail here. In a particular embodiment, the display unit of the terminal is a touch screen display, a storage 21 of the terminal is similar to the above-described database, and may be used for storing a sampling period, a sampling time interval, or frame rate statistics.

In the terminal according to the present embodiment, one or more programs are stored in the storage 21, one or more the above processors 27 are configured to execute instructions contained in the one or more programs to perform a user identity verification method including:
  receiving an operation request sent by a user via a user terminal, wherein the operation request contains a user identity of the user;
  generating identity verification information according to the user identity;
  sending the identity verification information to an NFC terminal through near field communication with the NFC terminal, so that the NFC terminal prompts the user to provide identity acknowledgement;
  receiving identity acknowledgement information from the NFC terminal through the near field communication with the NFC terminal, if the identity acknowledgement is provided by the user, wherein the identity acknowledgement information contains an identifier of the NFC terminal used by the user;
  determining whether the user identity matches the identifier of the NFC terminal according to the identity acknowledgement information; and
  sending operation response information to the user terminal used by the user if the user identity matches the identifier of the NFC terminal, wherein the operation response information is used to inform the user about the passage of the user through the identity verification.

It is also noted that the apparatus described above is merely illustrative, and the units described as separate members may be or not be physically separated, and may be or not be physical units. A part or all of the units may be selected to achieve the object of the present embodiment.

With the above description of the embodiments, those skilled in the art may understand that the present invention may be implemented by means of software in combination with necessary universal hardware, or by means of dedicated hardware such as dedicated integrated circuits, a dedicated CPU, a specialized memory, and special components. Generally, a function performed by a computer program can be easily implemented by corresponding hardware. Further, the same function may be implemented by different specific hardware, e.g., analog circuitry, digital circuitry or a dedicated circuit. However, the present invention is mostly implemented by a software program. Based on such understanding, the technical nature of the present invention or the part contributing to the prior art may be embodied in the form of a software program, which may be stored in the storage medium, such as a computer floppy disk, a removable flash memory, a portable hard disk, a read-only memory (ROM), a random access memory (RAM), a magnetic disk, or a compact disk, and the storage medium includes computer-readable instructions configured for making a computer device (which may be a personal computer, a server, or network equipment, etc.) execute the methods according to various embodiments of the method of the present invention.

The embodiments described above are exemplary, and are not intended to limit the present invention, equivalent structures and flow modifications according to the present description and drawings, or usage in other relative field are included in the protection scope of the present invention.

What is claimed is:

1. A user identity verification method, comprising:
  at a password protection apparatus, wherein the password protection apparatus is a server system storing a user information database of established binding relationships between user account identifiers of user accounts and NFC identifiers used to verify the user accounts:
    receiving an operation request initiated by a user of a user account from a mobile phone via a first network, wherein the operation request comprises a request to perform a transaction requiring verification of the user account, and wherein the operation request includes an identifier of the user account;
    in response to receiving the operation request, generating an identity verification request to verify the user account identifier;
    sending the identity verification request to an NFC terminal within the mobile phone, wherein the identity verification request is sent via a second network to an NFC information exchange device for transmission through near field communication to the NFC terminal within the mobile phone, so that the mobile phone prompts the user to provide acknowledgement of the operation request; and
    in response to the user providing acknowledgment of the operation request:
      receiving identity acknowledgement information that includes an NFC identifier of the NFC terminal within the mobile phone, wherein the identity acknowledgment information is received by the NFC information exchange device from the NFC terminal within the mobile phone through the near field communication and returned to the password protection apparatus via the second network;
      determining whether the user account identifier in the operation request and the NFC identifier in the identity acknowledgement information correspond to an established binding relationship stored in the user information database; and in accordance with a determination that the user account identifier and the NFC identifier correspond to an established binding relationship stored in the user information database, sending operation response information to the mobile phone, wherein the operation response information is used to inform the user that the user account identifier has been verified for the operation request and the transaction is performed.

2. The method of claim 1, including, at the password protection apparatus, before receiving the operation request:

authenticating the user over the network to access the user account from the mobile phone;

in accordance with successful authentication of the user to access the user account, receiving, from the mobile phone, the NFC identifier of the NFC terminal within the mobile phone and an identity credential pertaining to the user;

verifying the identity credential using an authentication algorithm; and in accordance with successful verification of the identity credential, establishing a binding relationship between the user account identifier of the user account and the NFC identifier of the NFC terminal.

3. The method of claim 2, wherein determining whether the user account identifier in the operation request and the NFC identifier in the identity acknowledgement information correspond to an established binding relationship stored in the user information database includes:

determining whether the binding relationship between the user account identifier and the NFC identifier is established and stored in the user information database; and, if the binding relationship between the user account identifier and the NFC identifier is established and stored in the user information database, determining that the user account identifier and the NFC identifier correspond to an established binding relationship; otherwise, determining that the user account identifier and the NFC identifier do not correspond to an established binding relationship.

4. A password protection apparatus, wherein the password protection apparatus is a server system storing a user information database of established binding relationships between user account identifiers of user accounts and NFC identifiers used to verify the user accounts, and wherein the password protection apparatus comprises:

one or more processors;
memory; and
one or more programs, wherein the one or more programs are stored in the memory and configured to be executed by the one or more processors, the one or more programs including instructions for:

receiving an operation request initiated by a user of a user account from a mobile phone via a first network, wherein the operation request comprises a request to perform a transaction requiring verification of the user account, and wherein the operation request includes an identifier of the user account;

in response to receiving the operation request, generating an identity verification request to verify the user account identifier;

sending the identity verification request to an NFC terminal within the mobile phone, wherein the identity verification request is sent via a second network to an NFC information exchange device for transmission through near field communication to the NFC terminal within the mobile phone, so that the mobile phone prompts the user to provide acknowledgement of the operation request; and in response to the user providing acknowledgment of the operation request:

receiving identity acknowledgement information that includes an NFC identifier of the NFC terminal within the mobile phone, wherein the identity acknowledgment information is received by the NFC information exchange device from the NFC terminal within the mobile phone through the near field communication and returned to the password protection apparatus via the second network;

determining whether the user account identifier in the operation request and the NFC identifier in the identity acknowledgement information correspond to an established binding relationship stored in the user information database; and in accordance with a determination that the user account identifier and the NFC identifier correspond to an established binding relationship stored in the user information database, sending operation response information to the mobile phone, wherein the operation response information is used to inform the user that the user account identifier has been verified for the operation request and the transaction is performed.

5. The password protection apparatus of claim 4, wherein the one or more programs include instructions for, before receiving the operation request:

authenticating the user over a network to access the user account from the mobile phone;

in accordance with successful authentication of the user to access the user account, receiving, from the mobile phone, the NFC identifier of the NFC terminal within the mobile phone and an identity credential pertaining to the user;

verifying the identity credential using an authentication algorithm; and in accordance with successful verification of the identity credential, establishing a binding relationship between the user account identifier of the user account and the NFC identifier of the NFC terminal.

6. The password protection apparatus of claim 5, wherein determining whether the user account identifier in the operation request and the NFC identifier in the identity acknowledgement information correspond to an established binding relationship stored in the user information database includes:

determining whether the binding relationship between the user account identifier and the NFC identifier is established and stored in the user information database; and, if the binding relationship between the user account identifier and the NFC identifier is established and stored in the user information database, determining that the user account identifier and the NFC identifier correspond to an established binding relationship; otherwise, determining that the user account identifier and the NFC identifier do not correspond to an established binding relationship.

7. A non-transitory computer readable storage medium storing one or more programs, the one or more programs comprising instructions, which when executed by one or more processors of a password protection apparatus, wherein the password protection apparatus is a server system storing a user information database of established binding relationships between user account identifiers of user accounts and NFC identifiers used to verify the user accounts, cause the password protection apparatus to:

receive an operation request initiated by a user of a user account from the mobile phone via a first network, wherein the operation request comprises a request to perform a transaction requiring verification of the user account, and wherein the operation request includes an identifier of the user account;

in response to receiving the operation request, generate an identity verification request to verify the user account identifier;

send the identity verification request to an NFC terminal within the mobile phone, wherein the identity verification request is sent via a second network to an NFC information exchange device for transmission through near field communication to the NFC terminal, so that the mobile phone prompts the user to provide acknowledgement of the operation request; and     in response to the user providing acknowledgment of the operation request:

receive identity acknowledgement information that includes an NFC identifier of the NFC terminal within the mobile phone, wherein the identity acknowledgment information is received by the NFC information exchange device from the NFC terminal within the mobile phone through the near field communication and returned to the password protection apparatus via the second network;

determine whether the user account identifier in the operation request and the NFC identifier in the identity acknowledgement information correspond to an established binding relationship stored in the user information database; and         in accordance with a determination that the user account identifier and the NFC identifier correspond to an established binding relationship stored in the user information database, send operation response information to the mobile phone, wherein the operation response information is used to inform the user that the user account identifier has been verified for the operation request and the transaction is performed.

8. The non-transitory computer readable storage medium of claim 7, wherein the one or more programs include instructions, which when executed by the one or more processors of the password protection apparatus, cause the password protection apparatus to, before receiving the operation request:

authenticate the user over a network to access the user account from the mobile phone;

in accordance with successful authentication of the user to access the user account, receive, from the mobile phone, the NFC identifier of the NFC terminal within the mobile phone and an identity credential pertaining to the user;

verify the identity credential using an authentication algorithm; and     in accordance with successful verification of the identity credential, establish a binding relationship between the user account identifier of the user account and the NFC identifier of the NFC terminal.

9. The non-transitory computer readable storage medium of claim 8, wherein determining whether the user account identifier in the operation request and the NFC identifier in the identity acknowledgement information correspond to an established binding relationship stored in the user information database includes:

determine whether the binding relationship between the user account identifier and the NFC identifier is established and stored in the user information database; and, if the binding relationship between the user account identifier and the NFC identifier is established and stored in the user information database, determining that the user account identifier and the NFC identifier correspond to an established binding relationship; otherwise, determining that the user account identifier and the NFC identifier do not correspond to an established binding relationship.

\* \* \* \* \*